(12) United States Patent
Kang et al.

(10) Patent No.: US 8,634,717 B2
(45) Date of Patent: Jan. 21, 2014

(54) DDOS ATTACK DETECTION AND DEFENSE APPARATUS AND METHOD USING PACKET DATA

(75) Inventors: Kyoung-Soon Kang, Daejeon-si (KR);
Hak-Suh Kim, Daejeon-si (KR);
Byung-Jun Ahn, Daejeon-si (KR)

(73) Assignee: Electronics and Telecommunicatiions Research Institute, Daejeon (KR)

( * ) Notice: Subject to any disclaimer, the term of this patent is extended or adjusted under 35 U.S.C. 154(b) by 0 days.

(21) Appl. No.: 13/314,741

(22) Filed: Dec. 8, 2011

(65) Prior Publication Data

US 2012/0151583 A1    Jun. 14, 2012

(30) Foreign Application Priority Data

Dec. 13, 2010   (KR) .................. 10-2010-0127004

(51) Int. Cl.
*H04B 10/00* (2013.01)
(52) U.S. Cl.
USPC ............. 398/72; 370/412; 370/229; 370/463; 370/468; 370/235; 709/224; 709/223; 709/232; 709/235; 726/22; 726/23; 726/24; 726/25; 726/26; 398/58; 398/70; 398/77
(58) Field of Classification Search
USPC ........................................................ 726/23
See application file for complete search history.

(56) References Cited

U.S. PATENT DOCUMENTS

| 7,426,634 | B2 | 9/2008 | Jain | |
|---|---|---|---|---|
| 2003/0086140 | A1* | 5/2003 | Thomas et al. | 359/167 |
| 2005/0111367 | A1* | 5/2005 | Chao et al. | 370/235 |
| 2011/0099622 | A1* | 4/2011 | Lee et al. | 726/13 |

FOREIGN PATENT DOCUMENTS

| KR | 10-2004-0092314 | 11/2004 |
|---|---|---|
| KR | 10-0479202 | 3/2005 |
| KR | 10-2010-0066170 | 6/2010 |

\* cited by examiner

*Primary Examiner* — Nathan Flynn
*Assistant Examiner* — Bryan Wright
(74) *Attorney, Agent, or Firm* — Staas & Halsey LLP

(57) ABSTRACT

A Distributed Denial of Service (DDoS) attack detection and defense apparatus and method are provided. The Distributed Denial of Service (DDoS) attack detection and defense apparatus includes: a flow information collection unit to collect, from one or more input packets with an IP address of an attack target system as a destination IP address, flow information including source IP addresses of the input packets and packet counts of one or more flows that are classified for each of the source IP addresses and each of different protocol types; an inspection unit to calculate packets per second (PPS) values of the flows based on the packet counts; and a response unit to determine a DDoS attack response method for each of the flows based on the PPS value and the protocol type of a corresponding flow and to process the corresponding flow using the determined DDoS attack response method.

9 Claims, 3 Drawing Sheets

DDOS ATTACK DETECTION AND DEFENSE APPARATUS AND METHOD USING PACKET DATA

CROSS-REFERENCE TO RELATED APPLICATION(S)

This application claims the benefit under 35 U.S.C. §119(a) of Korean Patent Application No. 10-2010-0127004, filed on Dec. 13, 2010, in the Korean Intellectual Property Office, the entire disclosure of which is incorporated herein by reference for all purposes.

BACKGROUND

1. Field

The following description relates to a Distributed Denial of Service (DDoS) attack detection and defense apparatus and method of a router in an Internet Protocol (IP) network.

2. Description of the Related Art

Typical distributed Denial of Service (DDoS) attack defense methods for use in routers include a black hole routing technique or a sink hole routing technique, which are widely used by internet service providers (ISPs). The black hole routing technique, which is also referred to as null routing, is characterized by forwarding all traffic to the Null0 interface, which is a virtual interface, to drop the traffic. However, since, according to the black hole routing technique, all traffic is routed to the Null0 interface, an attack target server may not be able to continue to provide services, which is the exact purpose of a DDoS attack.

Access control list (ACL)-based packet filtering may also be used as a DDoS attack defense method. The ACL-based packet filtering method is generally used in core routers or backbone switches and is useful especially when a large-scale UDP attack or DDoS attack is identified. However, the ACL-based packet filtering method lacks precision. Thus, the ACL-based packet filtering method may not be able to properly handle TCP attacks or large-scale IP address spoofing, and may result in an increase in the cost of management. For example, to reduce the cost of management, the ACL-based packet filtering method may be applied only to an attack target system. In this example, the attack target system may not be able to continue to provide services, which is the goal of a DDoS attack.

A security equipment-based defense method may also be used as a DDoS attack defense method. The security equipment-based defense method may be characterized by defending an attack target system against a DDoS attack using firewalls or an intrusion prevention system (IPS). The security equipment-based defense method may utilize existing router systems and may respond to various attack patterns including layer-7 attacks. However, in the security equipment-based defense method, the performance of a whole service network may be considerably affected by the performance of security equipment, and the service network may be highly vulnerable to a large-scale DDoS attack. In addition, the security equipment-based defense method requires high-bandwidth security equipment, which is very expensive.

SUMMARY

The following description relates to allowing a router in an Internet Protocol (IP) network to detect a Distributed Denial of Service (DDoS) attack against a predetermined attack target system without the aid of external security equipment and to protect the attack target system from the DDoS attack.

In one general aspect, there is provided a Distributed Denial of Service (DDoS) attack detection and defense apparatus, including: a flow information collection unit configured to collect, from one or more input packets with an IP address of an attack target system as a destination IP address, flow information including source IP addresses of the input packets and packet counts of one or more flows that are classified for each of the source IP addresses and each of different protocol types; an inspection unit configured to calculate packets per second (PPS) values of the flows based on the packet counts; and a response unit configured to determine a DDoS attack response method for each of the flows based on the PPS value and the protocol type of a corresponding flow and to process the corresponding flow using the determined DDoS attack response method.

In another general aspect, there is provided a DDoS attack detection and defense method, including: collecting, from one or more input packets with an IP address of an attack target system as a destination IP address, flow information including source IP addresses of the input packets and packet counts of one or more flows that are classified for each of the source IP addresses and each of different protocol types; calculating PPS values of the flows based on the packet counts; and determining a DDoS attack response method for each of the flows based on the PPS value and the protocol type of a corresponding flow; and processing the corresponding flow using the determined DDoS attack response method.

Other features and aspects may be apparent from the following detailed description, the drawings, and the claims.

Figure 1:
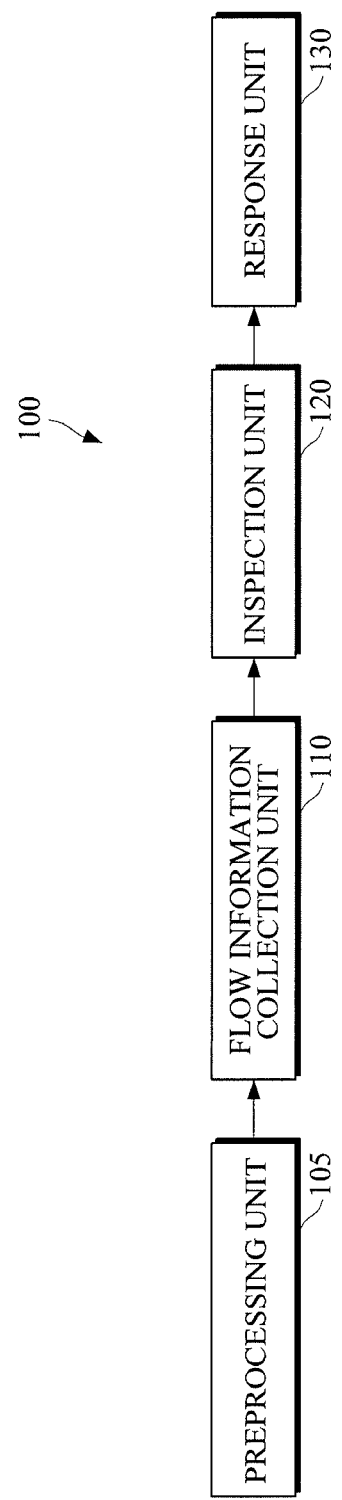
FIG. 1 is a diagram illustrating an example of a Distributed Denial of Service (DDoS) attack detection and defense apparatus.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of a Distributed Denial of Service (DDoS) attack detection and defense apparatus.

Referring to FIG. 1, DDoS attack detection and defense apparatus 100 includes a preprocessing unit 105, a flow information collection unit 110, an inspection unit 120, and a response unit 130. For example, the DDoS attack detection and defense apparatus 100 may include a router or a network switch equipped with a DDoS attack detection function.

The preprocessing unit 105 may be connected to an ingress port of the DDoS attack detection and defense apparatus 100, and may determine whether the source IP addresses of one or more input packets are legitimate IP addresses by using a reverse path check method. In response to the IP addresses of the input packets being determined to be illegitimate, the preprocessing unit 105 may drop the input packets. Input packets that are not dropped by the preprocessing unit 105 may be transmitted to the flow information collection unit 110. The preprocessing unit 105 may be optional.

The DDoS attack detection and defense apparatus 100 may inspect flow information on each attack target system per each unit period of time to detect any DDoS attack. For example, the manager of the DDoS attack detection and defense apparatus 100 may register the IP address of at least one attack target system in the DDoS attack detection and defense apparatus 100. In this example, the DDoS attack detection and defense apparatus 100 may collect flow information corresponding to one or more packets whose destination IP address corresponds with one of the registered IP address to detect a DDoS attack, and may perform a predetermined response operation on the one or more packets according to whether a DDoS attack is detected. In response to there being no IP address registered in the DDoS attack detection and defense apparatus 100, the DDoS attack detection and defense apparatus 100 may perform DDoS attack detection and defense on all input packets.

The flow information collection unit 110 may analyze header information of one or more input packets, and may collect from one or more input packets with an IP address of an attack target system as a destination IP address, flow information including source IP addresses of the input packets and packet counts of one or more flows that are classified for each of the source IP addresses and each of different protocol types.

A flow (or a data traffic flow) may be defined as a group of packets having the same combination of fields that may be extracted from a data packet header. In general, a flow may be a group of packets having the same source IP address, the same destination IP address, the same protocol type (or the same protocol value), the same source port number, and the destination port number. For example, a flow may be defined as a group of packets having the same destination IP address, the same source IP address, and the same protocol type.

The flow information collection unit 110 may classify one or more input packets into one or more flows according to their destination IP address, source IP address, and protocol type, and may count the number of packets included in each of the flows. The flow information collection unit 110 may also collect average packet size information of any Transmission Control Protocol (TCP) flow among the classified flows from the input packets.

Figure 2:
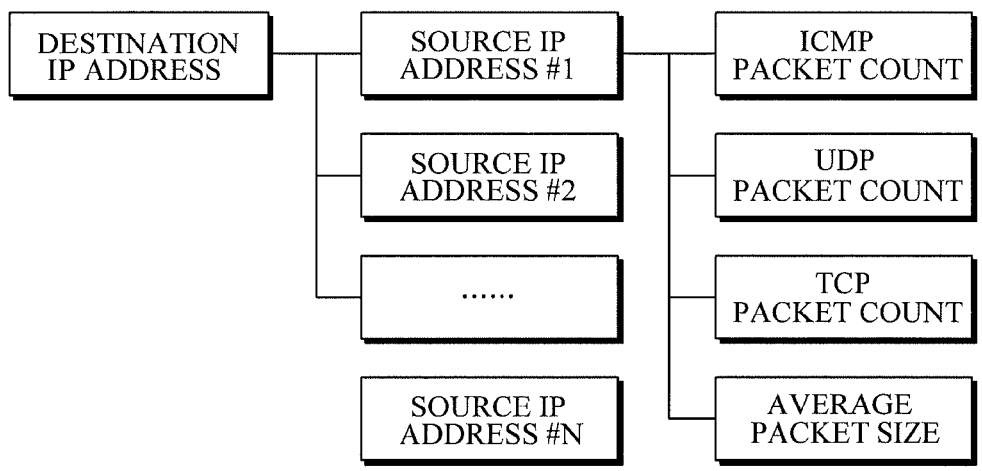
FIG. 2 is a diagram illustrating an example of information collected by a flow information collection unit illustrated in FIG. 1 for the purpose of detecting a DDoS attack.

FIG. 2 illustrates an example of flow information collected by the flow information collection unit 110 to detect a DDoS attack.

Referring to FIG. 2, flow information may include a destination IP address, one or more source IP addresses that are collected from one or more input packets with the destination IP address, and the packet counts of one or more flows of different protocol types that originate from each of the source IP addresses. For example, for a single destination IP address, one or more source IP addresses and information on one or more flows of different protocol types that originate from each of the source IP addresses may be obtained as flow information. For example, a flow information collection unit 110 may collect a destination IP address, source IP address #1 and the packet count for Internet Control and Message protocol (ICMP) flow. In addition, the flow information collection unit 110 may collect a destination IP address, source IP address #1 and the packet count for a User Datagram Protocol (UDT) flow. The flow information collection unit may also collect a destination IP address, source IP address #1, the packet count and average packet size information for a TCP flow. The average packet size information may be collected for other flows. In particular, the average packet size information of the TCP flow may be used to detect a DDoS attack.

Referring back to FIG. 1, the inspection unit 120 may calculate the packets per second (PPS) value of each flow.

The response unit 130 may determine a DDoS attack response method for each flow based on the PPS value and protocol type of each flow, and may handle one or more input packets using the determined DDoS attack response method. The response unit 130 may include a response method profile that shows a DDoS response method for each flow, and may determine how to respond to a DDoS attack according to the response method profile. For each flow, the response method profile may define different DDoS attack methods for different PPS values. For example, for a TCP flow, the response method profile may show different DDoS attack methods for different PPS values and for different average packet sizes.

The response unit 130 may perform one of the following three response operations: a first response operation that includes collecting log information on one or more input packets; a second response operation that includes probabilistically dropping a current flow; and a third response operation that includes probabilistically dropping a previous flow. The second and third response operations may both be characterized by dropping one or more packets of a flow. The second response operation may be performed on a flow currently being input to the DDoS attack detection and defense apparatus 100, and the third response operation may be performed on a flow previously input to the DDoS attack detection and defense apparatus 100 a predetermined amount of time (for example, N seconds) after the previously-input flow is complete.

The response unit 130 may perform different response operations for different ranges of PPS values. For example, the response unit 130 may perform the first response operation on a flow whose PPS value falls within a first range, and may perform the second and third response operations on a flow whose PPS value is greater than any value in the first range and falls within a second range.

The response unit 130 may set a PPS threshold that is used to detect a DDoS attack for each flow. For example, the response unit 130 may set a PPS threshold for an ICMP flow to be higher than a PPS threshold for a UDP flow, and may set the PPS threshold for a UDP flow to be higher than a PPS threshold for a TCP flow. For example, the response unit 130 may identify a flow whose PPS value is greater than the PPS threshold as a DDoS attack. The PPS threshold may be a maximum allowed PPS value that each flow may have not to be identified as a DDoS attack. The response unit 130 may set different PPS thresholds for different flows. The PPS threshold for each flow may be reset by the manager of the DDoS attack detection and defense apparatus 100.

For example, the response unit 130 may perform the first response operation on an ICMP flow with a PPS value of 10 or greater and may perform the second and third response operations on an ICMP flow with a PPS value of 20 to 30 with a drop probability of 20%. For example, the expression 'performing the second and third response operations with a drop probability of 20%' indicates dropping 20% of the packets of a flow and passing the rest of the packets of the flow. For example, the response unit 130 may perform the second and third response operations on an ICMP flow with a PPS value of 30 to 40 with a drop probability of 40%, may perform the second and third response operations on an ICMP flow with a PPS value of 40 to 50 with a drop probability of 60%, and may perform the second and third response operations on an ICMP flow with a PPS value of 50 or greater with a drop probability of 80%.

The response unit 130 may process a UDP flow using a similar method to that used to process an ICMP flow. The response unit 130 may set a PPS threshold for a UDP flow to be lower than a PPS threshold for an ICMP flow so that more packets may be dropped from a UDP flow than from a ICMP flow even if the UDP flow and the ICMP flow have the same PPS value.

The response unit 130 may determine how to handle a TCP flow based on both the PPS value of the TCP flow and average packet size information of the TCP flow. For example, the response unit 130 may perform the second and third response operations on a TCP flow with an average packet size of 200 bytes or less and a PPS value of 10 to 20 with a drop probability of 30%, may perform the second and third response operations on a TCP flow with an average packet size of 200 bytes or less and a PPS value of 20 to 30 with a drop probability of 50%, and may perform the second and third response operations on a TCP flow with an average packet size of 200 bytes or less and a PPS value of 30 or greater with a drop probability of 70%.

The smaller the average packet size of a TCP flow, the more packets the response unit 130 may drop from the TCP flow. When performing the second and third response operations, the response unit 130 may apply a higher drop probability to a TCP flow with a small average packet size of, for example, 100 bytes or less, than to a TCP flow with a large average packet size so that more packets may be dropped from the TCP flow with a small average packet size than from the TCP flow with a large average packet size even if the two TCP flows have the same PPS value. For example, the response unit 130 may perform the second and third response operations on a TCP flow with an average packet size of 100 bytes or less and a PPS value of 10 to 20 with a drop probability of 40%, and may perform the second and third response operations on a TCP flow with an average packet size of 100 bytes or less and a PPS value of 20 or greater with a drop probability of 60%. The response unit 130 may also apply a higher drop probability to a TCP flow with a small size in bytes than to a TCP Flow with a large size in bytes.

For example, in response to a DDoS attack being detected, the response unit 130 may be switched to a DDoS attack response mode, and may perform a DDoS attack response operation. In this example, the response unit 130 may be released from the DDoS attack response mode in response to a predetermined condition being met. For example, the response unit 130 may be released from the DDoS attack response mode in response to a DDoS attack release declaration issued by a government agency or another agency with authority being lifted, or in response to the lapse of a predetermined amount of time (for example, ten minutes), or in response to the PPS value of each flow being maintained below a predetermined threshold for more than a predetermined amount of time.

Figure 3:
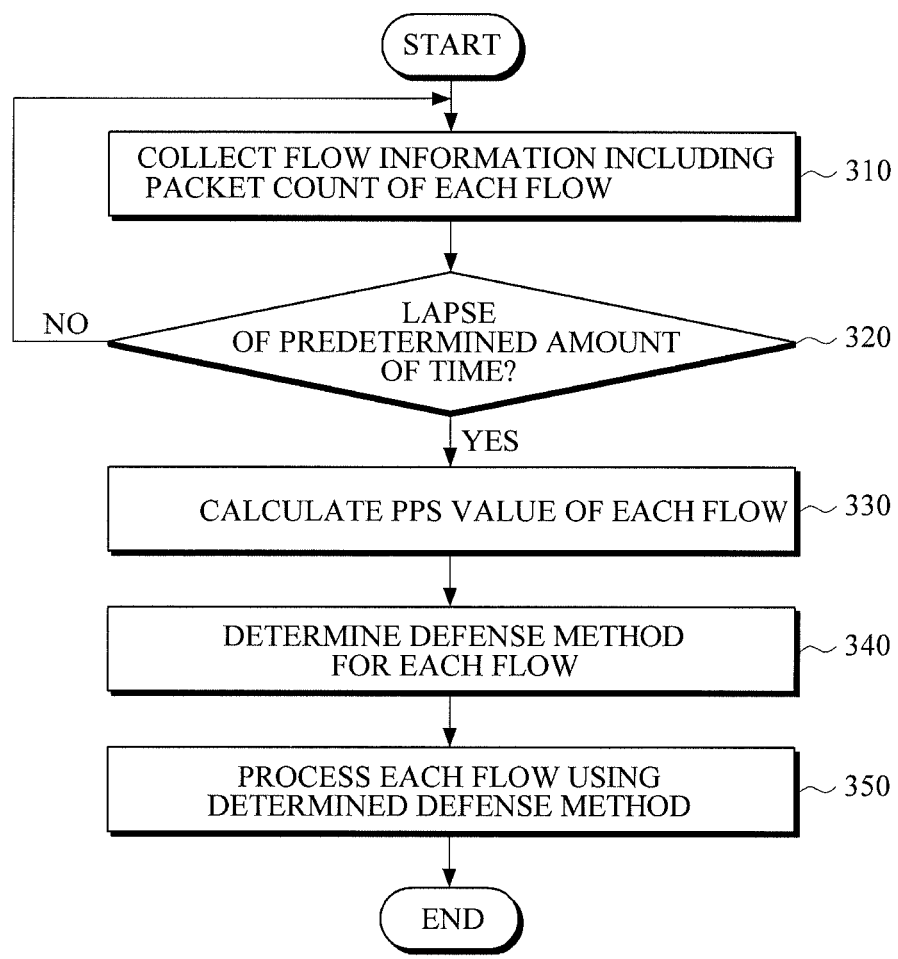
FIG. 3 is a flowchart illustrating an example of a DDoS attack detection and defense method.

FIG. 3 illustrates an example of a DDoS attack detection and defense method.

Referring to FIG. 3, in 310, a DDoS attack detection and defense apparatus may collect, from one or more input packets with an IP address of an attack target system as a destination IP address, flow information including source IP addresses of the input packets and packet counts of one or more flows that are classified for each of the source IP addresses and each of different protocol types.

In 320 and 330, in response to the lapse of a predetermined amount of time, which is the amount of time that it generally takes to collect flow information to detect a DDoS attack, the DDoS attack detection and defense apparatus may calculate the PPS values of the one or more flows based on the packet counts of the one or more flows.

In 340, the DDoS attack detection and defense apparatus may determine a DDoS attack response method for each of the one or more flows based on the PPS values and the protocol types of the one or more flows.

For example, the DDoS attack detection and defense apparatus may select one of the following three response operations: a first response operation that includes collecting log information on the input packets; a second response operation that includes probabilistically dropping a current flow; and a third response operation that includes probabilistically dropping a previous flow. For example, the DDoS attack detection and defense apparatus may set different PPS thresholds for different types of flows such as, for example, an ICMP flow, a UDP flow, and a TCP flow, may compare the PPS values of the one or more flows with their respective PPS thresholds, and may determine whether each of the one or more flows corresponds to a DDoS attack.

For example, for a TCP flow, the DDoS attack detection and defense apparatus may determine a DDoS attack response method based on the PPS value and the average packet size of the TCP flow. In this example, the DDoS attack detection and defense apparatus may set a lower PPS threshold for a TCP flow with a small average packet size than for a TCP flow with a large average packet size so that the TCP flow with a small average packet size may become more likely than the TCP flow with a large average packet size to be identified as a DDoS attack.

In 350, the DDoS attack detection and defense apparatus may process the one or more flows by performing the DDoS attack response methods determined in 340.

As described above, since a DDoS attack response method is performed for each attack target system and for each protocol, the manager of a DDoS attack detection and defense apparatus may simply need to maintain only a few response method profiles. Therefore, it is possible to reduce the cost of management as compared to an access control list (ACL) method.

In addition, it is possible to reduce the traffic of security equipment of an attack target system by working with the security equipment. Accordingly, it is possible to effectively defend an attack target system against various DDoS attacks using low bandwidth. Since the security equipment does not need to have as high bandwidth as backbone bandwidth, it is possible to reduce the operating cost of the security equipment.

Moreover, it is possible for an attack target system to continue to provide services even under a DDoS attack. Furthermore, it is possible to guarantee high network speed even under a DDoS attack.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A Distributed Denial of Service (DDoS) attack detection and defense apparatus, comprising: a flow information collection unit configured to collect, from one or more input packets with an IP address of an attack target system as a destination IP address, flow information including source IP addresses of the input packets and packet counts of one or more flows that are classified for each of the source IP addresses and each of different protocol types; an inspection unit configured to calculate packets per second (PPS) values of the flows based on the packet counts; and a response unit configured to determine a DDoS attack response method for each of the flows based on the PPS value and the protocol type of a corresponding flow and to process the corresponding flow using the determined DDoS attack response method, wherein the response unit is further configured to determine a DDoS attack response method for a TCP flow among the flows based on a PPS value and average packet size information of the TCP wherein the response unit is further configured to perform the second and third operations by applying a higher drop probability to a TCP flow with a small average packet size than to a TCP flow with a large average packet size so that more packets may be dropped from the TCP flow with a small average packet size than from the TCP flow with a large average packet size and wherein the response unit is further configured to determine different DDoS attack response methods for different ranges of PPS values.

2. The DDoS attack detection and defense apparatus of claim 1, wherein the flow information collection unit is further configured to analyze headers of the input packets, to classify the input packets according to the source IP addresses based on the results of the analysis, to obtain one or more flows of different protocol types that are classified for each of the source IP addresses and to count a number of packets that are included in each of the flows.

3. The DDoS attack detection and defense apparatus of claim 1, wherein the flow information collection unit is further configured to, in response to there being a Transmission Control Protocol (TCP) flow among the flows, collect average packet size information of the TCP flow as the flow information.

4. The DDoS attack detection and defense apparatus of claim 1, wherein the response unit is further configured to perform at least one of a first response operation that includes collecting log information on the input packets, a second response operation that includes probabilistically dropping a current flow, and a third response operation that includes probabilistically dropping a previous flow.

5. The DDoS attack detection and defense apparatus of claim 1, wherein the response unit is further configured to set a PPS threshold for an Internet Control and Message protocol (ICMP) flow, a PPS threshold for a user data protocol (UDP) threshold, and a PPS threshold for a TCP flow and to identify each of the flows as an DDoS attack in response to the PPS value of each of the flows exceeding a corresponding PPS threshold.

6. A DDoS attack detection and defense method, comprising: collecting, from one or more input packets with an IP address of an attack target system as a destination IP address, flow information including source IP addresses of the input packets and packet counts of one or more flows that are classified for each of the source IP addresses and each of different protocol types; calculating packets per second (PPS) values of the flows based on the packet counts; and determining a DDoS attack response method for each of the flows based on the PPS value and the protocol type of a corresponding flow; and processing the corresponding flow using the determined DDoS attack response method, wherein the collecting the flow information comprises, in response to there being a TCP flow among the flows, collecting average packet size information of the TCP flow as the flow information and the determining the DDoS attack defense method for each of the flows comprises determining a DDoS attack response method for the TCP flow based on a PPS value and the average packet size information of the TCP flow, wherein the determining the DDoS attack defense method for each of the flows further comprises applying a higher drop probability to a TCP flow with a small average packet size than to a TCP flow with a large average packet size so that more packets may be dropped from the TCP flow with a small average packet size than from the TCP flow with a large average packet size and wherein the response unit is further configured to determine different DDoS attack response methods for different ranges of PPS values.

7. The DDoS attack detection and defense method of claim 6, wherein the determining the DDoS attack defense method for each of the flows comprises performing at least one of a first response operation that includes collecting log information on the input packets, a second response operation that includes probabilistically dropping a current flow, and a third response operation that includes probabilistically dropping a previous flow.

8. The DDoS attack detection and defense method of claim 6, wherein the determining the DDoS attack defense method for each of the flows comprises: setting a PPS threshold for an ICMP flow, a PPS threshold for a UDP threshold, and a PPS threshold for a TCP flow; and comparing the PPS values of the flows with their respective PPS thresholds and determining whether each of the flows corresponds to a DDoS attack based on the results of the comparison.

9. The DDoS attack detection and defense method of claim 6, wherein the collecting the flow information comprises: analyzing headers of the input packets; classifying the input packets according to the source IP addresses based on the results of the analysis; obtaining one or more flows of different protocol types that are classified for each of the source IP addresses; and counting a number of packets that are included in each of the flows.

* * * * *